(12) United States Patent
Kume et al.

(10) Patent No.: US 6,208,098 B1
(45) Date of Patent: Mar. 27, 2001

(54) VARIABLE FREQUENCY DRIVE NOISE ATTENUATION CIRCUIT

(75) Inventors: Tsuneo Kume, Arlington Heights; Mahesh M. Swamy, Gurnee, both of IL (US)

(73) Assignee: Yaskawa Electric America, Inc., Waukegan, IL (US)

( * ) Notice: Subject to any disclaimer, the term of this patent is extended or adjusted under 35 U.S.C. 154(b) by 0 days.

(21) Appl. No.: 09/460,124

(22) Filed: Dec. 13, 1999

Related U.S. Application Data

(63) Continuation-in-part of application No. 09/045,333, filed on Mar. 2, 1998.

(51) Int. Cl.$^7$ ................................................ H02K 23/00
(52) U.S. Cl. .................... 318/254; 318/800; 318/801; 318/803; 318/804; 318/807; 318/813; 363/34; 363/35; 363/39; 363/40
(58) Field of Search ................................. 363/34, 35, 39, 363/40; 318/254, 439, 800, 801, 803, 804, 807, 813

(56) References Cited

U.S. PATENT DOCUMENTS

| | | | |
|---|---|---|---|
| 4,692,854 | 9/1987 | Baxter, Jr. et al. | 363/75 |
| 4,937,540 | * 6/1990 | Carlson et al. | 333/12 |
| 4,967,334 | * 10/1990 | Cook et al. | 363/34 |
| 5,124,567 | 6/1992 | Fujita et al. | 307/147 |
| 5,251,120 | * 10/1993 | Smith | 363/44 |
| 5,784,236 | 7/1998 | Tardiff et al. | 361/56 |
| 5,850,336 | 12/1998 | Nakajima | 363/39 |
| 5,956,246 | * 9/1999 | Sequeira et al. | 363/144 |
| 6,118,678 | * 9/2000 | Limpaecher et al. | 363/60 |

FOREIGN PATENT DOCUMENTS 9-84357   9/1995   (JP) .

OTHER PUBLICATIONS

R. Kerkman, D. Leggate, and Gary Skibinski, "Interaction of Drive Modulation & Cable Parameters on AC Motor Transients", IEEE IAS Annual Meeting 1996, pp. 143–152.

Y. Murai, T. Kubota, and Y Kawase, "Leakage Current Reduction for a High–Frequency Carrier Inverter Feeding an Induction Motor", IEEE Transactions on Industry Applications, vol. 28, No. 4, Jul./Aug. 1992, pp. 858–863.

S. Ogasawara, H. Ayano, and H. Akagi, "Measurement and Reduction of EMI Radiated by a PWM Inverter–Fed AC Motor Drive System", IEEE IAS Annual Meeting 1996, pp. 1072–1079.

(List continued on next page.)

*Primary Examiner*—Robert E. Nappi
*Assistant Examiner*—Rita Leykin
(74) *Attorney, Agent, or Firm*—Wood, Phillips, VanSanten, Clark & Mortimer

(57) ABSTRACT

A noise attenuation circuit is disclosed for use in a motor drive system. The motor drive system includes a pulse width modulated inverter providing three phase power output on three phase conductors for driving a motor. The noise attenuation circuit includes a common mode transformer including a common mode choke having a core, with first, second and third choke windings on the core, each connected in series with one of the three phase conductors, and a fourth winding on the core. A three phase iron core transformer creates a neutral point representing common mode voltage. The iron core transformer has three primary windings connected in a wye configuration. A capacitor circuit is connected between the iron core transformer and the three phase conductors to prevent saturation of the iron core transformer during pulsed DC operating conditions. The fourth winding is connected between the neutral point and the DC bus and develops a common mode voltage that is equal and opposite to that existing in the system. This common mode voltage, when impressed across the three choke windings, effectively cancels the systems' common mode voltage thereby reducing the common mode current significantly.

20 Claims, 2 Drawing Sheets

OTHER PUBLICATIONS

A. von Jouanne, D. Rendusara, and P. Enjeti, "Filtering Techniques to Minimize the Effect of Long Motor Leads on PWM Inverter–Fed AC Motor Drive Systems", IEEE Transactions on Industry Applications, vol. 32, No. 4, Jul./Aug. 1996.

S. Ogasawara, H. Ayano, and H. Akagi, "An Active Circuit for Cancellation of Common–Mode Voltage Generated by a PWM Inverter", Conference Record, IEEE PESC 1997, pp. 1547–1553.

I. Takahashi, A. Ogata, H. Kanajawa, and A. Hiruma, "Active EMI Filter for Switching Noise of High Frequency Inverters", Conference Record, IEEE PESC 1997, pp. 331–334.

* cited by examiner

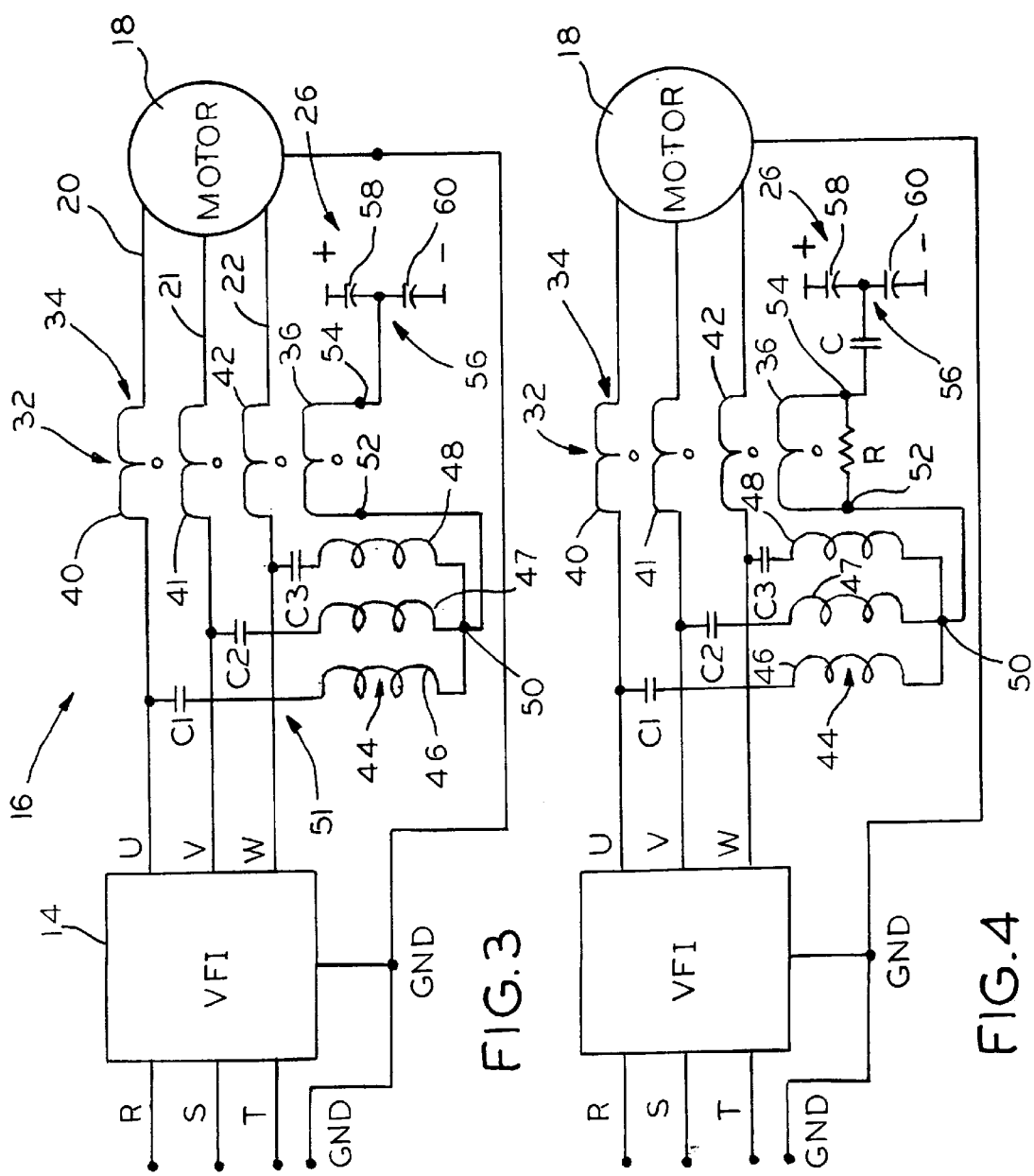

VARIABLE FREQUENCY DRIVE NOISE ATTENUATION CIRCUIT

CROSS REFERENCE

This application is a continuation-in-part of U.S. patent application Ser. No. 09/045,333, filed Mar. 2, 1998

FIELD OF THE INVENTION

This invention relates to a variable frequency inverter and, more particularly, to a noise attenuation circuit used with a pulse width modulated inverter.

BACKGROUND OF THE INVENTION

A motor drive system, in one known form, comprises an AC source supplying three-phase AC power to a variable frequency inverter (VFI). The VFI includes an AC/DC converter to connected by a DC link to a DC/AC converter. The DC/AC converter may comprise a pulse width modulated inverter using insulated gate bipolar transistors (IGBTs).

In general, the output of the VFI is modulated at a carrier frequency ranging from one kHz to 20 kHz. The higher carrier frequency, particularly in small sized VFIs up to 75 kilowatts, along with the fast rise time of the IGBTs employed results in high dv/dt. This, in turn, yields non-trivial common mode or ground currents. If the distance between the motor and the VFI is long and there exists a mismatch in the cable and motor surge impedance, then there is voltage amplification at the motor terminals. Hence, the dv/dt effects in conjunction with larger cable capacitance enhances the common mode currents.

In practice, the over voltage at the motor terminals, which depends upon the distance between the motor and the VFI as well as the impedance mismatch between the cable and the motor surge impedance, can reach as high as twice the DC bus voltage. In certain cases, due to overlap of the modulating pulses, the peak transient appearing across the motor windings can be as high as three times the DC bus voltage. The high rate of rise of voltage pulses in the range of a few hundreds of nanoseconds give rise to ground currents due to cable capacitance to ground and motor winding capacitance to ground.

The over voltage at the motor terminals due to long lead lengths can cause premature to insulation failure in the motor. There exists a non-trivial parasitic capacitance between the stator and the rotor, which is instrumental in creating a charge path between the stator and the rotor. Due to large dv/dt of the common mode voltage, and the above mentioned parasitic capacitance, the rotor develops a voltage similar to a charge pump. When this voltage exceeds the breakdown voltage of the thin lubricant film between the inner and outer rings of the bearing, there is a miniature flashover. This causes pitting in the bearings and is the main reason for premature bearing failure. If not properly mitigated, high frequency ground currents can also create interference with the power system ground and affect other equipment on the power system. This phenomenon contributes to conducted EMI.

Our pending application No. 09/045,333, filed Mar. 20, 1998, the specification of which is incorporated by reference herein, discloses a passive circuit for canceling common mode current. The passive circuit uses a neutral point provider in the form of a three-phase iron core transformer and a common mode transformer.

A DC output is generated in induction motor drives during braking conditions. In servo applications, this DC output component is responsible for developing holding torque. The three phase iron core transformer that creates the neutral point can saturate.

The present invention is directed to solving one or more of the problems discussed above in a novel and simple manner.

SUMMARY OF THE INVENTION

In accordance with the invention there is provided a noise attenuation circuit operable to cancel main common mode current and prevent saturation.

Broadly, there is disclosed herein a noise attenuation circuit used in a motor drive system. The motor drive system includes a pulse width modulated inverter providing three phase power output on three phase conductors for driving a motor. The noise attenuation circuit includes a common mode transformer including a common mode choke having a core, with first, second and third choke windings on the core, each connected in series with one of the three phase conductors, and a fourth winding on the core. A three phase iron core transformer creates a neutral point representing common mode voltage. The iron core transformer has three primary windings connected in a wye configuration. A capacitor circuit is connected between the iron core transformer and the three phase conductors. The fourth winding is connected between the neutral point and the DC bus to reduce main common mode current.

It is a feature of the invention that the fourth winding is wound in the same sense as the three choke windings. All four windings are on the same core.

It is another feature of the invention that the fourth winding is connected to a midpoint of the DC bus to force a current, dependent on voltage of the neutral point relative to midpoint of the DC bus, in the fourth winding of the common mode transformer in an opposite direction to cancel main common mode current. Two capacitors are series connected across the DC bus, and a junction of the two capacitors defines the midpoint of the DC bus.

It is a further feature of the invention to provide a differentiating circuit connected to the fourth winding. The differentiating circuit comprises an RC network. The differentiating circuit comprises a resistor connected across the fourth winding and a capacitor connected between the fourth winding and the DC bus.

It is another feature of the invention that the capacitor circuit comprises a blocking capacitor connected in series with each of the three primary windings. The blocking capacitors are connected between the primary windings and the three phase conductors. The blocking capacitors have values selected to provide a resonant point formed with the primary windings to be less than a switching frequency of the inverter and higher than a fundamental frequency of the inverter.

In accordance with another aspect of the invention there is disclosed a noise attenuation circuit used in a motor drive system. The motor drive system includes a variable frequency drive having a pulse width modulated inverter providing three phase power output on three phase conductors for driving a motor. The noise attenuation circuit includes a common mode transformer including a common mode choke having a core, with first, second and third choke windings on the core, each connected in series with one of the three phase conductors, and a fourth winding on the core. A three phase iron core transformer creates a neutral point representing common mode voltage. The iron core transformer has three primary windings connected in a wye configuration. A capacitor circuit is connected between the iron core transformer and the three phase conductors. The fourth winding is connected between the neutral point and the DC bus to reduce main common mode current.

Further features and advantages of the invention will be readily apparent from the specification and from the drawings.

BRIEF DESCRIPTION OF THE DRAWINGS

FIG. 3 is a partial block diagram, similar to FIG. 1, showing a circuit implementation of the noise attenuation circuit according to the invention;

FIG. 4 is a partial block diagram, similar to FIG. 1, showing a circuit implementation of the noise attenuation circuit according to an alternative embodiment; and FIG. 5 is a plan view of a common mode transformer used with the noise attenuation circuit.

DETAILED DESCRIPTION OF THE INVENTION

Figure 1:
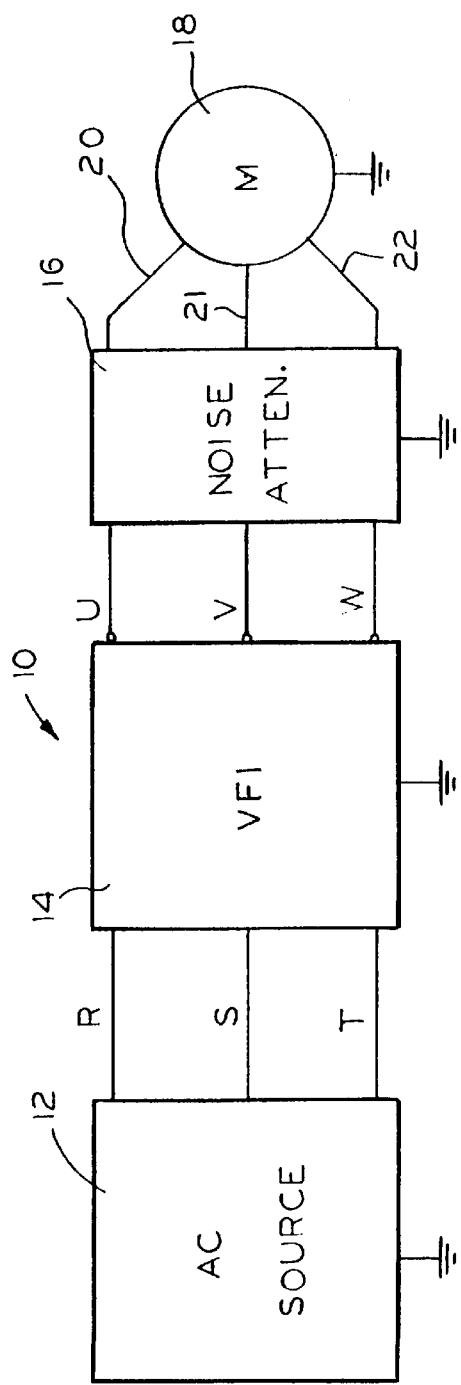
FIG. 1 is a generalized block diagram of a motor drive system including a noise attenuation circuit according to the invention.

Referring initially to FIG. 1, a motor drive system 10 is illustrated. The motor drive system includes an AC source 12, a variable frequency inverter (VFI) 14 and a noise attenuation circuit 16 for driving an induction motor 18. The AC source 12 may comprise a drive or the like developing three-phase AC power on feeder conductors labeled R, S and T. The AC source 12 is grounded. The VFI 14, as described more particularly below, converts the AC power from the feeder conductors R, S and T, to DC power and converts it back to AC power at a select frequency which is then impressed across terminals U, V and W. The three-phase power from the VFI 14 is passed through the noise attenuation circuit 16. The noise attenuation circuit 16 is connected to three feeder conductors 20, 21 and 22 to drive the motor 18.

Figure 2:
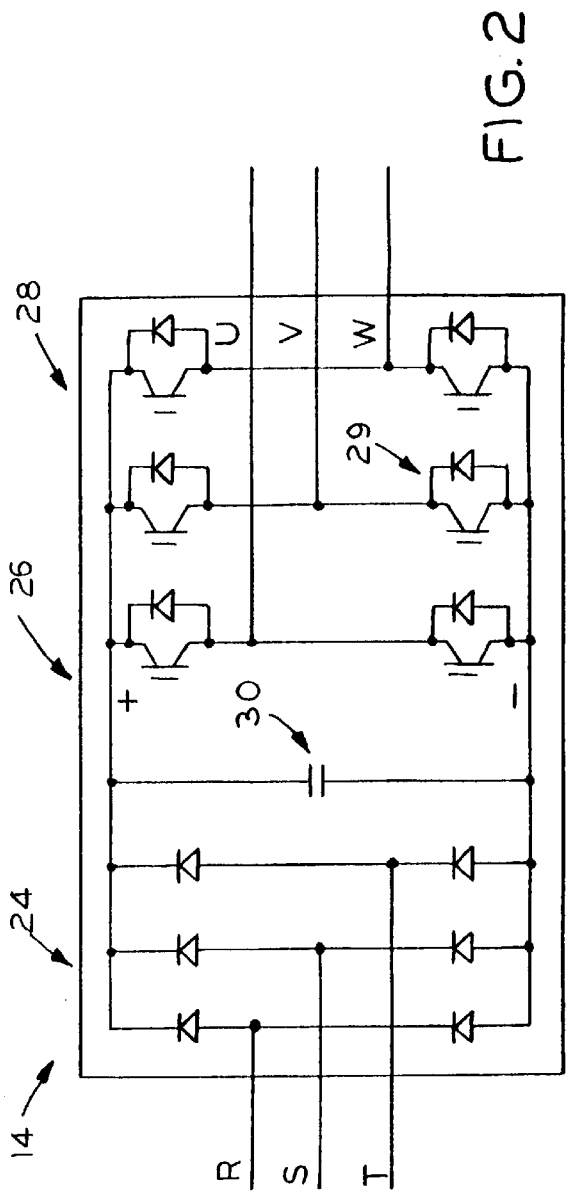
FIG. 2 is a schematic diagram of a variable frequency inverter of FIG. 1.

Referring to FIG. 2, a schematic diagram illustrates a typical circuit implementation for the VFI 14. The VFI 14 includes an AC/DC converter 24 connected by a DC bus 26 to a DC/AC converter 28. Particularly, according to the illustrated embodiment of the invention, the AC/DC converter 24 comprises a full wave bridge rectifier circuit of conventional construction which is operable to convert three-phase AC power to DC power. The DC bus 26 includes a conventional filter 30. The DC bus 26 has rails labeled "+" and "−". The DC/AC converter 28 comprises an inverter. Particularly, the inverter 28 comprises a pulse width modulation (PWM) inverter using insulated gate bipolar transistors (IGBTs) 29. The six IGBTs 29 are connected in a three phase bridge configuration to the DC bus 26 to develop power at the terminals U, V and W. The IGBTs 29 are pulse width modulated using a conventional control at a carrier frequency ranging from one kHz to twenty kHz. Particularly, the PWM inverter 14 is controlled to create a sinusoidal effect for the induction motor 18. The pulse frequency used is fixed. The pulse width is varied to vary sinusoidal frequency. The IGBTs are high speed switches that can produce dv/dt as high as 3,000 V/micro-sec.

The AC source 12 typically supplies 460 volts AC. This is converted to approximately 650–700 volts DC on the DC bus 26.

The VFI circuit 14 shown is illustrative of a typical inverter circuit. The noise attenuation circuit according to the invention is usable with other types of inverter circuit designs, as will be apparent to those skilled in the art.

As described above, the high carrier frequency, along with fast rise time of the IGBTs, results in high dv/dt which yields non-trivial common mode or ground currents. In accordance with the invention, the noise attenuation circuits herein are operable to divert common mode currents from flowing at the motor end.

As with the noise attenuation circuit disclosed in our pending application No. 09/045,333, incorporated by reference herein, the present invention relates to a passive circuit for providing noise attenuation. The present invention prevents saturation in a neutral forming circuit for use in servo amplifiers, brushless DC drives and for induction motor drives.

Referring to FIG. 3, a noise attenuation circuit 16 according to a first embodiment of the invention is illustrated. The noise attenuation circuit 16 comprises a passive circuit for diverting common mode currents from flowing at the motor 18. The passive circuit overcomes drawbacks of prior active schemes which are limited in their applicability to lower voltage systems. The passive circuit also has a higher reliability compared to active filtering schemes.

The attenuation circuit 16 includes a common mode transformer 32. Particularly, the common mode transformer 32 comprises a common mode choke 34 with an additional winding 36. The common mode transformer includes a core 38, see FIG. 5, with first, second, and third choke windings 40, 41 and 42. The choke windings 40–42 are connected in series with the respective feeder conductors 20–22, as shown in FIG. 3 to the VFI terminals U, V and W. The additional, or fourth, winding 36 is wound in the same sense as the three choke windings 40–42.

A three-phase iron core transformer 44 creates a neutral point to obtain the common mode voltage. Three primary windings 46, 47 and 48 are connected in a wye configuration including a junction 50 to define the neutral point. In order to apply this circuit for all possible operating modes of PWM drives, a capacitor circuit 51 includes three capacitors C1, C2 and C3 added in series with the respective primary windings 46, 47 and 48 and connected to the respective terminals U, V and W. The neutral point 50 is connected to a start 52 of the common mode transformer fourth winding 36. An end 54 of the fourth winding 36 is connected to a midpoint 56 of the DC bus 26. The midpoint 56 is formed at a junction of two capacitors 58 and 60 series connected across the DC bus 26.

The fourth winding 36 develops a common mode voltage that is equal and opposite to that existing in the system. This common mode voltage when impressed across the remaining three windings 40–42 effectively cancels the systems' common mode voltage thereby reducing the common mode current significantly.

The capacitors C1–C3 block the output DC component from flowing into the windings 46–48 of the iron core transformer 44 to prevent saturation under pulsed DC operating conditions. The value of the capacitors C1–C3 are selected so that the resonant point formed by inductance of the transformer winding and the DC blocking capacitor is much lower than the switching frequency, or carrier frequency, of the VFI IGBTs 29. The value is also selected so the resonant point is also much higher than the maximum output fundamental frequency of the VFI 14. This suggests a small value for the capacitors C1–C3. Typical values are in the range from 0.01 $\mu$F to 0.1 $\mu$F. This also helps keep the normal mode currents in the transformer windings to a low value. The addition of the capacitors C1–C3 does not alter the voltage waveform at the neutral point 50 with respect to the DC bus midpoint 56.

A further improved circuit is illustrated in FIG. 4 with a noise attenuation circuit 16' according to an alternative embodiment of the invention. Where elements are similar to those in the noise attenuation circuit 16 of FIG. 3, like reference numerals are used for simplicity.

The circuit 16' differs in adding a damping resistor R in series with a capacitor C between the neutral point 50 and the DC bus midpoint 56. The resistor R is connected across the fourth winding 36. With this circuit the peak-to-peak common mode current is reduced, as is the RMS value of the common mode current similar to with the circuit of FIG. 3. The damping resistor R effectively damps oscillation, thereby reducing the peak-to-peak common mode voltage and current.

Thus, in accordance with the invention, a noise attenuation circuit is provided which does not use active parts and is thus not restricted to low voltage applications. The circuit can be applied to both 460V as well as 575V systems. No transistors are used, so that the reliability of the circuit is higher than with active circuits. The output voltage as seen by the motor 18 is almost sinusoidal, which alleviates the problem of voltage reflection phenomenon. Common mode currents (ground currents) are attenuated significantly on the motor end as well as at the inverter end. The use of the damping resistor in FIG. 4 in series with the capacitor C helps to damp oscillations in the common mode voltage. This in turn helps reduce common mode current flowing at the motor as well as at the inverter end. Moreover, the blocking capacitors C1–C3 prevent DC components from saturating the windings 46–48.

We claim:

1. In a motor drive system including a pulse width modulated inverter providing three phase power output on three phase conductors for driving a motor, a noise attenuation circuit comprising:
    a common mode transformer including a common mode choke having a core, with first, second and third choke windings on the core, each connected in series with one of the three phase conductors, and a fourth winding on the core;
    a three phase iron core transformer to create a neutral point representing common mode voltage, the iron core transformer having three primary windings connected in a wye configuration;
    a capacitor circuit connected between the iron core transformer and the three phase conductors; and
    the fourth winding being connected between the neutral point and the DC bus to reduce main common mode current.

2. The noise attenuation circuit of claim 1 wherein the fourth winding is wound in the same sense as the three choke windings.

3. The noise attenuation circuit of claim 1 wherein the fourth winding end is connected to a midpoint of the DC bus to force a current, dependent on voltage of the neutral point relative to mid-point of the DC bus, in the fourth winding of the common mode transformer in an opposite direction to cancel main common mode current.

4. The noise attenuation circuit of claim 3 wherein two capacitors are series connected across the DC bus, and a junction of the two capacitors defines the midpoint of the DC bus.

5. The noise attenuation circuit of claim 1 further comprising a differentiating circuit connected to the fourth winding.

6. The noise attenuation circuit of claim 5 wherein the differentiating circuit comprises an RC network.

7. The noise attenuation circuit of claim 6 wherein the differentiating circuit comprises a resistor connected across the fourth winding and a capacitor connected between the end of the fourth winding and the DC bus.

8. The noise attenuation circuit of claim 1 wherein the capacitor circuit comprises a blocking capacitor connected in series with each of the three primary windings.

9. The noise attenuation circuit of claim 8 wherein the blocking capacitors are connected between the primary windings and the three phase conductors.

10. The noise attenuation circuit of claim 8 wherein the blocking capacitors have values selected to provide a resonant point formed with the primary windings to be less than a switching frequency of the inverter and higher than a fundamental frequency of the inverter.

11. In a motor drive system including a variable frequency drive having a pulse width modulated inverter converting DC power from a DC bus to three phase power at inverter output terminals connected via three feeder conductors to a motor, a noise attenuation circuit connected between the inverter output terminals and the feeders comprising:
    a common mode transformer including a common mode choke having a core, with first, second and third choke windings on the core, each connected in series with one of the three phase conductors, and a fourth winding on the core;
    a three phase iron core transformer to create a neutral point representing common mode voltage, the iron core transformer having three primary windings connected in a wye configuration;
    a blocking capacitor circuit connected between the iron core transformer and the three phase conductors to prevent saturation of the primary windings; and
    the fourth winding being connected between the neutral point and the DC bus to reduce main common mode current.

12. The noise attenuation circuit of claim 11 wherein the fourth winding is wound in the same sense as the three choke windings.

13. The noise attenuation circuit of claim 11 wherein the fourth winding end is connected to a midpoint of the DC bus to force a current, dependent on voltage of the neutral point relative to midpoint of the DC bus, in the fourth winding of the common mode transformer in an opposite direction to cancel main common mode current.

14. The noise attenuation circuit of claim 13 wherein two capacitors are series connected across the DC bus, and a junction of the two capacitors defines the mid-point of the DC bus.

15. The noise attenuation circuit of claim 11 further comprising a differentiating circuit connected to the fourth winding.

16. The noise attenuation circuit of claim 15 wherein the differentiating circuit comprises an RC network.

17. The noise attenuation circuit of claim 16 wherein the differentiating circuit comprises a resistor connected across the fourth winding and a capacitor connected between the end of the fourth winding and the DC bus.

18. The noise attenuation circuit of claim 11 wherein the capacitor circuit comprises a blocking capacitor connected in series with each of the three primary windings.

19. The noise attenuation circuit of claim 18 wherein the blocking capacitors are connected between the primary windings and the three phase conductors.

20. The noise attenuation circuit of claim 18 wherein the blocking capacitors have values selected to provide a resonant point formed with the primary windings to be less than a switching frequency of the inverter and higher than a fundamental frequency of the inverter.

* * * * *